United States Patent [19]

Siegfried

[11] Patent Number: 4,953,347
[45] Date of Patent: Sep. 4, 1990

[54] GARDENING TOOL

[76] Inventor: Todd R. Siegfried, 405 Lyoncross Way, San Jose, Calif. 95123

[21] Appl. No.: 341,782

[22] Filed: Apr. 21, 1989

[51] Int. Cl.[5] .......................... A01B 1/16; A01D 7/00
[52] U.S. Cl. ................................. 56/400.12; 294/50.8
[58] Field of Search .................... 294/50.8, 50.9, 50.6, 294/57, 58, 118, 50.5, 50.7; 56/400.12, 400.04, 400.17, 400.18, 400.11, 400.13

[56] References Cited

U.S. PATENT DOCUMENTS

| | | | |
|---|---|---|---|
| 201,787 | 3/1878 | Hoover | 294/50.8 |
| 431,433 | 7/1890 | Brick | 294/50.8 |
| 659,518 | 10/1900 | Estlack | 294/50.8 |
| 2,503,998 | 4/1950 | Bussey | 294/50.8 X |
| 2,908,131 | 10/1959 | Ross | 56/400.12 X |
| 4,042,270 | 8/1977 | Weiland | 294/50.8 |

FOREIGN PATENT DOCUMENTS

| | | | |
|---|---|---|---|
| 18854 | 8/1906 | United Kingdom | 294/50.8 |
| 892501 | 3/1962 | United Kingdom | 294/50.8 |

Primary Examiner—Hoang C. Dang
Attorney, Agent, or Firm—Limbach, Limbach & Sutton

[57] ABSTRACT

An improved gardening tool includes two shovel-like members attached centrally whereby they may be used cooperatively to pick up debris of varying size and weight. Each shovel-like member is comprised of a rectangular blade attached to a cylindrical handle. The handle of one member is attached to the handle of the other by a bolt around which members are free to pivot. By moving the handles together in a scissor-like manner, a gardener can use blades to grasp and compress debris. The continuous straight edge of the blades allow a gardener to pick-up fine as well as coarse debris. Gardener can then move the debris to desired location and release by separating handles.

7 Claims, 13 Drawing Sheets

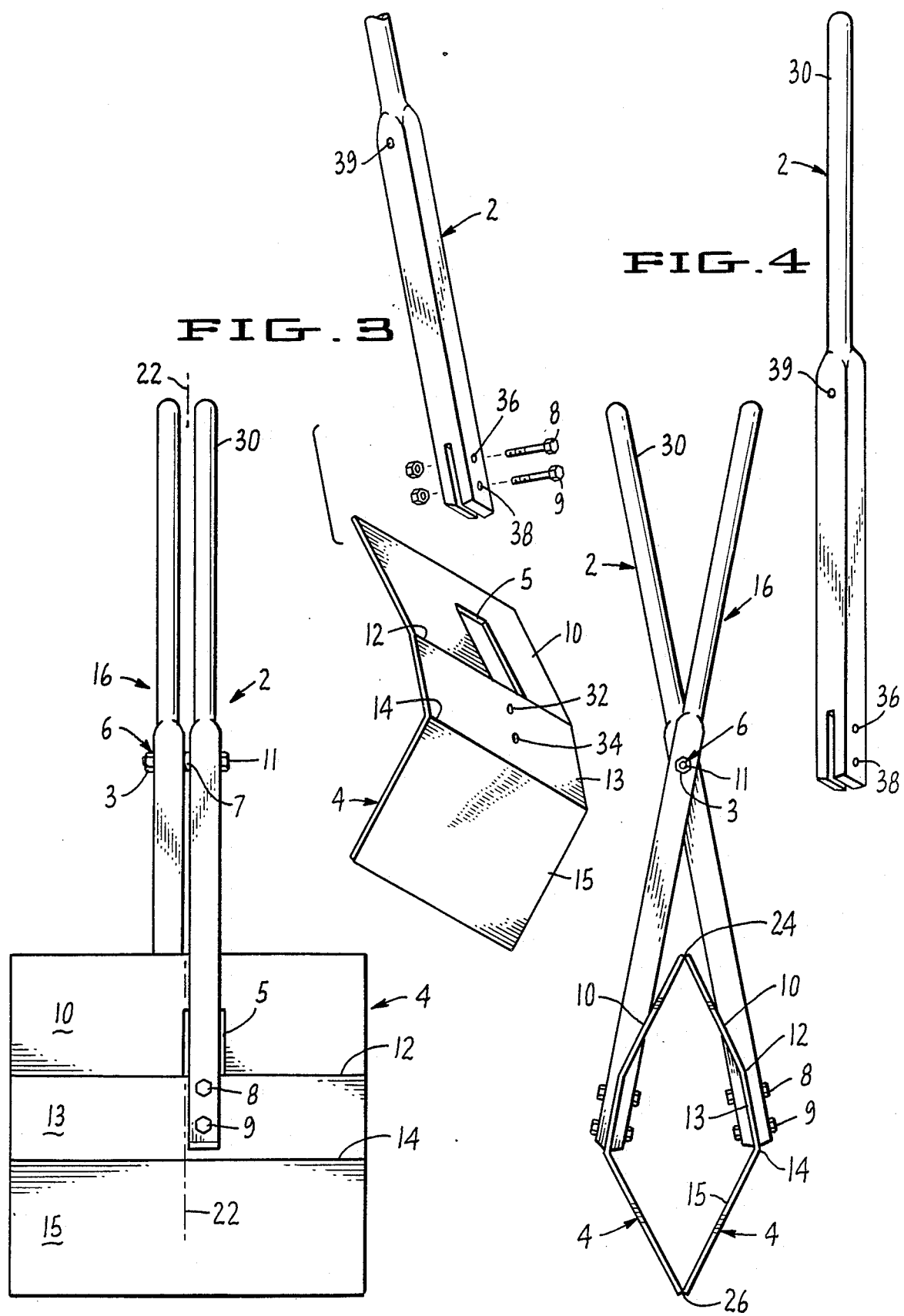

GARDENING TOOL

FIELD OF THE INVENTION

This invention relates to tools for moving matter, and in particular to tools used to move garden debris.

BACKGROUND OF THE INVENTION

Traditional tools used to move garden debris include shovels and rakes. The volume of debris which a gardener can pick up with a shovel is limited by the surface area of the blade and the friction between adjacent pieces of the debris. This makes shovels inappropriate for moving debris of low density. For instance, an ordinary shovel is of limited value for picking up leaves. A shovel can only support a small quantity of leaves. After picking up leaves with a shovel gravity or a slight breeze will cause the leaves to fall off before reaching the desired destination.

Rakes function well to move leaves across the ground but are of limited value for picking them up. A rake has the same limitations as a shovel for picking up leaves. Further, a rake is incapable of picking up fine debris. In fact, the rake is specifically designed to move leaves while leaving behind fine debris such as soil and pebbles. Thus, rakes are comprised of a multiplicity of slender blades, each separated by space to allow small debris to stay pass therethrough. Once a pile of leaves is collected, the gardener struggles to get all the debris into the disposal container. The gardener will usually use his hands or two rakes simultaneously to pick up the leaves, followed by a broom and a dust pan to pick up the remaining fine debris. Every person who has raked leaves has experienced this awkward process.

Modern attempts to improve the art have included engine driven blowers and rakes whose handles are attached. The blower only improves upon the rakes ability to move fine as well as coarse debris across the ground, but does not address the need to pick up, compress, and transfer the matter to a waste receptacle.

The double rake tool consists of two rakes whose handles are attached so that the rakes may be cooperatively used in a scissor-like manner to pick up leaves. This allows a gardener to pick up a relatively large volume of leaves. However, there are several problems with the double rake which limit its effectiveness. First, since the end of the tool which contacts the ground is a curved edge, as opposed to a straight edge, matter located adjacent to the central axis of the tool tends to fall outside the tool's reach and is therefore left behind. Second, fine matter falls through the spaces between the multiplicity of sticks which comprise the rake. Third, rakes employ flexible and lightweight blades, such as bamboo tines, which limit its ability to compress and compact debris.

Another tool is a small tong-like device used for picking up animal excrement. Like the double rake tool, the tong-like device is designed to selectively pick up matter of a particular size and consistency while leaving behind extraneous fine debris. The tong-like device is designed so that it is small enough to be used with one hand, making it convenient for its intended purpose, but limited in its capacity and its ability to compress and compact matter.

SUMMARY OF THE INVENTION

The object of this invention is to provide a more efficient means for picking up and compressing matter of variable size than is possible with conventional gardening tools. The present invention consists of two shovel-like members, attached centrally to one another so that they may be used cooperatively to pick-up and compress garden debris. The invention employs continuous solid blades which, unlike rakes, pick up fine as well as coarse debris. By centrally attaching the two members together, each member serves as a fulcrum for the other, whereby the gardener can exert substantial pressure on the collected mass compressing it to a smaller volume for efficient disposal.

The apparatus is designed so that it will fit into an ordinary home trash can while closed for further compression of articles such as leaves by pressing onto the leaves with the tool after release. The tool allows the gardener to minimize time and effort in collecting piles of debris and delivering to waste receptacle. The tool allows a gardener to maximize use of waste disposal space.

Related objects and advantages of the present invention will become apparent from reference to the drawings and the following description.

BRIEF DESCRIPTION OF THE DRAWINGS

FIG. 1 is a front view of a gardening tool for picking up debris according to a typical embodiment of the present invention.

FIG. 2 is a side view of the FIG. 1 tool in the closed position.

FIG. 3 is a partial perspective exploded view depicting a typical means for attaching handle to blade which comprises a portion of the FIG. 1 tool.

FIG. 4 is a perspective view of the handle of the FIG. 1 tool.

DESCRIPTION OF THE PREFERRED EMBODIMENT

Figure 5:
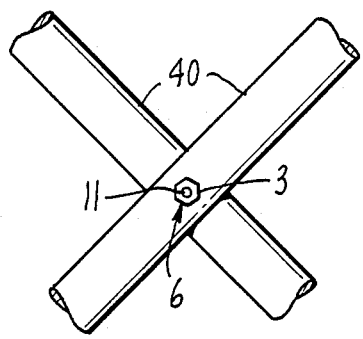
FIG. 5 is a partial side view of the handles, and means for attaching said handles in an alternate embodiment.

The following descriptions of the preferred and alternate embodiments are not intended to limit the scope of the present invention.

Referring to FIG. 1 and FIG. 2, the preferred embodiment is comprised of two identical members and means for attaching 6 the two members to one another. The following description of one member applies equally to the other member.

Each member consists of a rectangular metal blade 4, a square cylindrical wooden handle 2 and a means for attaching, 8 and 9, handle 2 to blade 4. In the preferred embodiment blade 4 has two folds 12 and 14 which run perpendicular to axis 22, creating three planar sections 10, 13, and 15. The folds in the blades are such that when the tool is in the closed position, as shown in FIG. 2, blades 4 and 8 touch at points 24 and 26 simultaneously.

Section 10 of blade 4 has a rectangular aperture 5 so that part of handle 2 can be attached to the inside surface of plane 13 of blade 4. See FIG. 3. Plane 13 of blade 4 has two holes, 32 and 34 in FIG. 3, centrally located below the rectangular cut of plane 10 of blade 4, whereby bolts 8 and 9 may be used to firmly attach handle 2 to blade 4.

Handle 2 is a wooden square cylinder. The square shape of the handle helps to stabilize the means for attaching, 6, the two handles 2 and 16 of the two members. In the following description the end of handle 2 which attaches to blade 4 is referred to as the "attaching end" and the end of handle 4 which has grip 30 as shown in FIG. 4, is referred to as the "grippable end".

To view an illustration of the preferred embodiment of the attaching end of handle 2 see FIG. 3. The attaching end of handle 2 is forked whereby it can straddle plane 13 of blade 4. Handle 2 has two holes 36 and 38, which are perpendicular to the slot of the fork and coincide with holes 32 and 34 in plane 13 of blade 4, when handle 2 is fit into straddle position over plane 13 of blade 4, whereby bolts 8 and 9 may be used to firmly attach handle 2 to blade 4. The grippable end of handle 2, as shown in FIG. 4, is rounded creating a more comfortable grip 30.

The handle 2 has a hole 39 running through its width approximately midway between the attaching end and the grippable end. The hole 39 is perpendicular to the holes 36 and 38. A bolt 11 and nut 3 passing through the hole 39 may be used to attach handle 2 of one member to handle 16 of the other member, forming a pivot point.

In the preferred embodiment, the means for attaching 6 the two members consists of a nut 3 and bolt 11 which extends through the holes in handles 2 and 16, and a washer 7 placed between the handles to minimize friction when moving the handles. Other attaching means may be used such as rivets or even a nail which is bent after being placed through the holes 39.

Figures 6, 7:
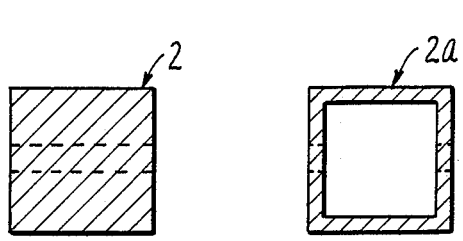
FIG. 6 is a cross section view of the handle of the FIG. 1 tool.
FIG. 7 is a cross section view of the handle portion of an alternate embodiment of the present invention.

In the preferred embodiment the handle 2 is a solid square cylinder as shown in FIG. 6. In an alternate embodiment the handle 2 a is a hollow square cylinder as shown in FIG. 7 such as formed by extruded aluminum. With square or rectangular cylinders the pivot point provides for rotation of two flat surfaces of the handles relative to one another. This is a stable configuration.

Figures 8, 9:
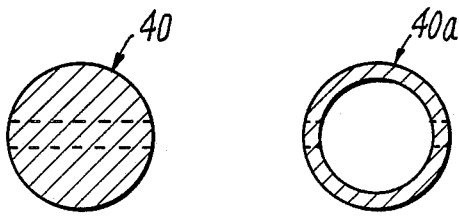
FIG. 8 is a cross section view of the handle portion of an alternate embodiment of the present invention.
FIG. 9 is a cross section view of the handle portion of an alternate embodiment of the present invention.

In an alternate embodiment the handle, 40 in FIG. 5, is a solid round cylinder as shown in FIG. 8. In an alternate embodiment the handle 40 a is a hollow round cylinder as shown in FIG. 9.

In an alternate embodiment the handles 40 and 42 are round cylinders as shown in FIG. 5. Such an embodiment has an inferior pivot point by allowing the handles to rotate relative to one another.

Figure 10:
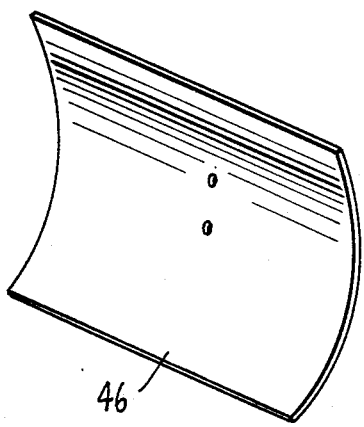
FIG. 10 is a partial perspective view of the blade portion of an alternate embodiment of the present invention.

In an alternate embodiment the blade portion 46 of each member is curved at its lower extremity as shown in FIG. 10. The handles are attached to the surface of the blade portion 46 away from the direction the curve in the blade is bent.

Figure 11:
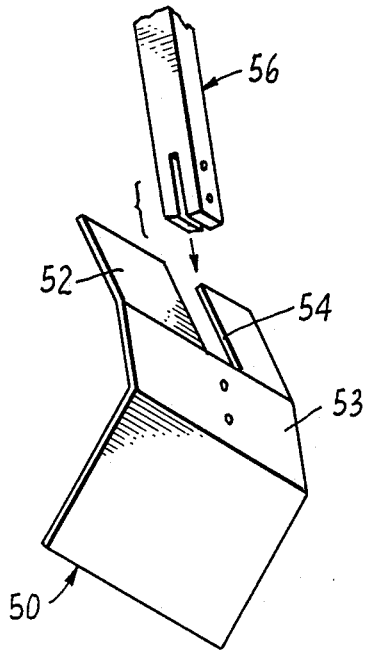
FIG. 11 is a partial perspective view of the blade and handle portions of an alternate embodiment of the present invention.

In an alternate embodiment planar section 52 of blade 50 in FIG. 11 has a cut-out 54 through which the forked portion of handle 56 may extend to be fastened to facial side of planar section 53.

Figure 12:
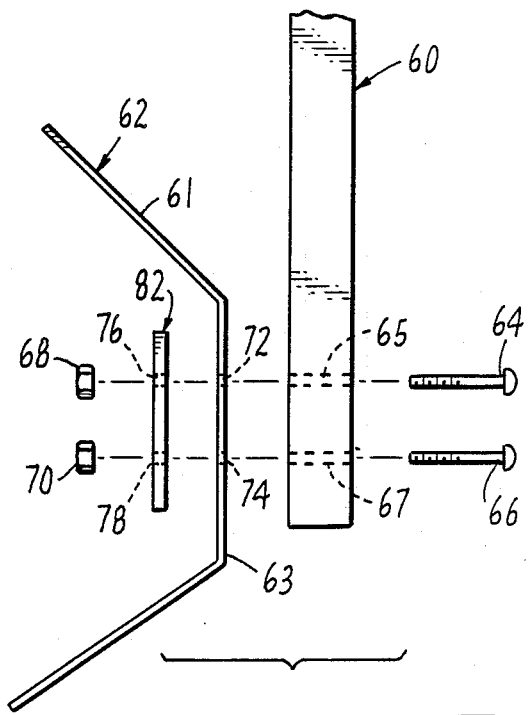
FIG. 12 is a partial side view of the means for attaching handle to blade in an alternate embodiment of the present invention.
Figure 13:
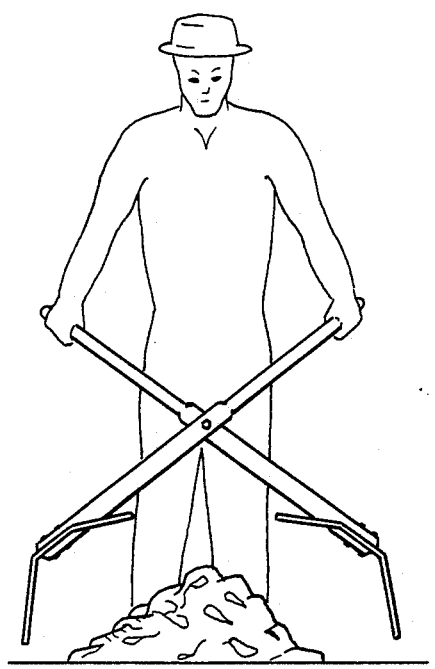
FIG. 13 is a front view of a gardener preparing to use the FIG. 1 tool to pick up debris.

In an alternate embodiment planar section 61 of blade 62 in FIG. 12 has no aperture or cut-out. The means for attaching handle 60 to the back side of planar section 63 of blade 62 is by extending two bolts 64 and 66 through handle holes 65 and 67, blade holes 72 and 74, and reinforcing plate 82 holes 76 and 78, and fastening with nuts 68 and 70.

Figure 14:
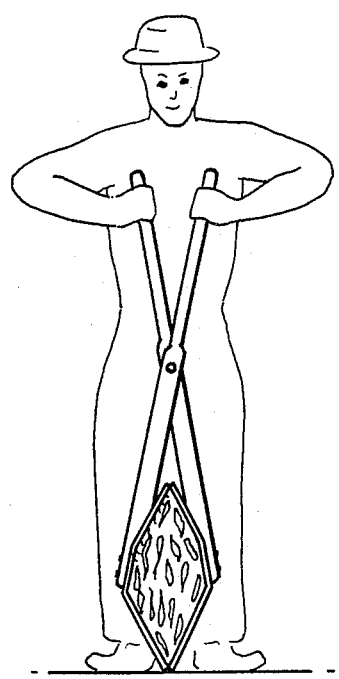
FIG. 14 is a front view of a gardener using the FIG. 1 tool to pick up and compress debris.
Figure 15:
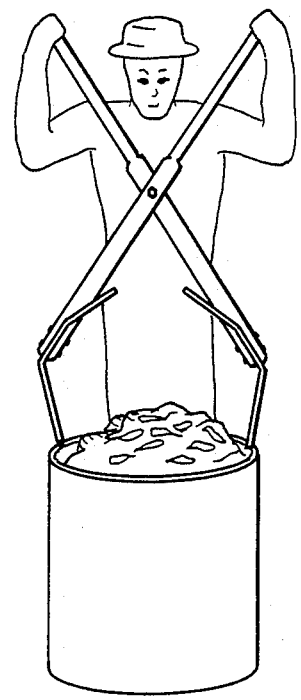
FIG. 15 is a front view of a gardener releasing debris from the FIG. 1 tool into a waste receptacle.
Figure 16:
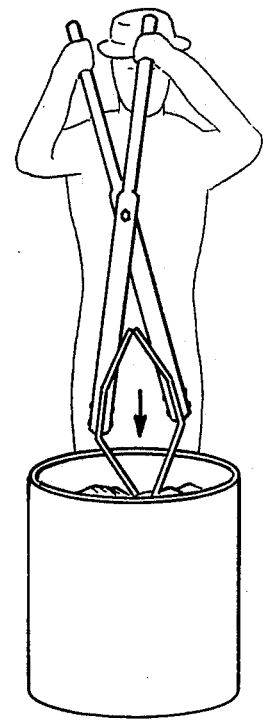
FIG. 16 is a front view of a gardener using the closed FIG. 1 tool to compress debris into waste receptacle.

FIGS. 13, 14, 15, and 16 illustrate how the gardening tool of FIG. 1 is used. In FIG. 14 gardener prepares to pick up debris with the FIG. 1 tool. In FIG. 14 gardener uses FIG. 1 tool to pick up and compress debris for easy transport to desired destination. In FIG. 15 gardener releases debris into waste receptacle by moving handles of FIG. 1 tool apart. In FIG. 16 gardener uses outer surface of FIG. 1 tool in closed position to compress debris into waste receptacle.

What is claimed is:

1. An apparatus for picking up and compressing low density matter comprising:
   a. a first member and a second member, each of said members comprising:
      (1) a substantially rectangular blade having a face and a back, the blade including a plurality of folds dividing blade into planar sections including two end sections and at least one central section forming a concave surface,
      (2) a cylindrical handle having a grippable end opposite from an attaching end, and
      (3) means for attaching said attaching end of said handle to the central section of said blade, said folds being perpendicular to said handel
   b. rotatable means for attaching said handle from said first member to said handle from said second member, said blade from said first member being maintained in a face to face relationship with said blade of said second member so that the concave surface of the first member is juxtaposed to the concave member of the second member, said attaching means forming a pivot allowing said blades to be brought together or separated by moving said members relative to one another in a scissor-like manner.

2. The apparatus of claim 1 wherein each of said blades has an aperture in one of said end sections for allowing the handle to be attached to the central section therethrough.

3. The apparatus of claim 2 wherein each of said blades is folded in two places, dividing blade into three planar sections, one central section and two lateral sections, said folds being parallel to each other, said folds being perpendicular to said handles.

4. The apparatus of claim 2 wherein each of said handles is forked on said attaching end allowing said attaching end of said handle to straddle said central section.

5. The apparatus of claim 1 wherein said handles are attached to the back of the central section of the blade.

6. Apparatus for picking up and compressing low density matter comprising:

a. a first member and a second member, each of said members comprising:
  (1) a rectangular metal blade having a face and a back, said blade having two parallel partial folds dividing said blade into one central planar section and two lateral planar sections, said folds being in the direction of said face of said blade so that said face is concave, wherein one of said lateral planar sections has a cut-out providing access from said back of said blade to said face of said central planar section of said blade, said central planer section having a plurality of holes centrally located;
b. a square cylindrical handle having a grippable end and an attaching end, said grippable end being opposite from said attaching end, said grippable end being rounded, said attaching end of said handle being forked allowing said handle to straddle said central planar section of said blade, said attaching end of said handle having a plurality of holes which coincide with said holes in said central planar section of said blade, said handle having a single hole approximately midway between said grippable end and said attaching end of said handle;
c. means for attaching said attaching end of said handle to said blade comprised of two nuts and two bolts, each of said bolts extending through said holes in said attaching end of said handle and said blade; and
d. means for attaching said handle from one member to said handle from other member, said attaching means comprising a nut and bolt, said bolt extending through holes in said handles, forming a pivot allowing said blades to be brought together or moved apart by moving the grippable ends of said handles in relation to each other.

7. The apparatus of claim 5 wherein each of said blades is folded in two places, dividing blade into three planar sections, one central section and two lateral sections, said folds being parallel to each other, said folds being perpendicular to each handles.

* * * * *

UNITED STATES PATENT AND TRADEMARK OFFICE
CERTIFICATE OF CORRECTION

PATENT NO. : 4,953,347

DATED : September 4, 1990

INVENTOR(S) : Todd R. Siegfried

It is certified that error appears in the above - identified patent and that said Letters Patent is hereby corrected as shown below:

ON TITLE PAGE:

Below the abstract, please delete "13 Drawing Sheets" and replace with --3 Drawing Sheets--.

In Column 3, Line 11, please replace "!5" with --15--.

In Column 4, Line 40, replace "handel" with --handle--.

Signed and Sealed this

Third Day of December, 1991

Attest:

HARRY F. MANBECK, JR.

*Attesting Officer*      *Commissioner of Patents and Trademarks*